March 14, 1944.　　S. BERGER, NÉE KERESZTES　　2,344,386
APPARATUS FOR THE PRODUCTION OF DECOCTIONS, ESPECIALLY TEA OR COFFEE
Filed Jan. 6, 1941
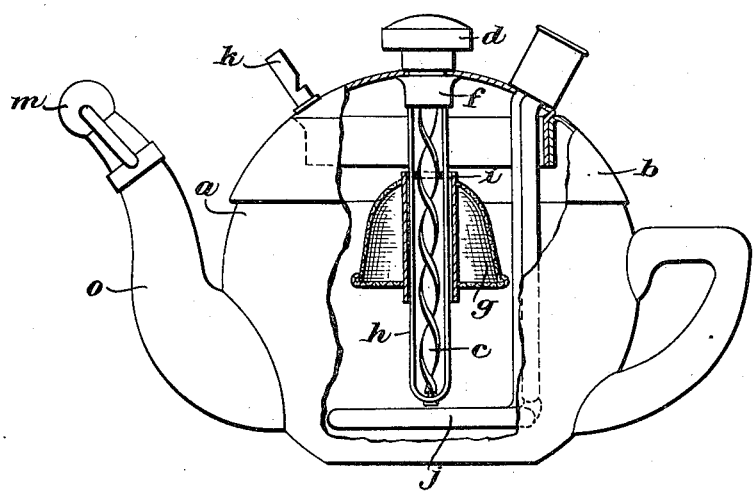
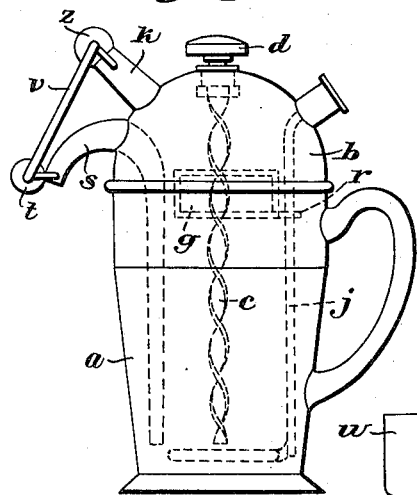
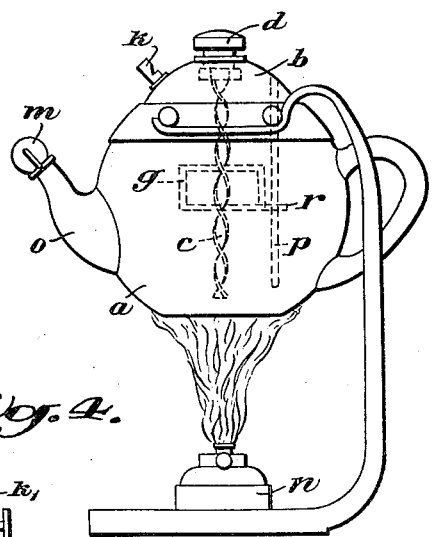
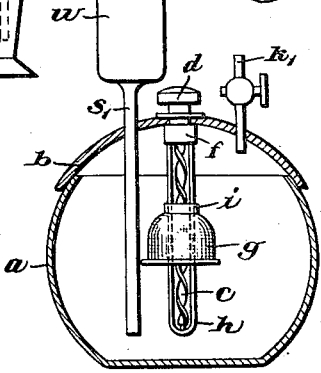
Inventor:
SUSANNAH BERGER NÉE KERESZTES
By Holcombe
Attorney.

Patented Mar. 14, 1944

2,344,386

UNITED STATES PATENT OFFICE 2,344,386

APPARATUS FOR THE PRODUCTION OF DECOCTIONS, ESPECIALLY TEA OR COFFEE

Susannah Berger, née Keresztes, Budapest, Hungary; vested in the Alien Property Custodian Application January 6, 1941, Serial No. 373,226
In Hungary October 22, 1940

2 Claims. (Cl. 99—319)

The invention relates to apparatus in which for the purpose of obtaining a decoction the substance of which a decoction is to be made may be parboiled at will in a closed space or in which, for the purpose of obtaining some gas or vapour, a chemical agent may be immersed at will in the closed space into a liquid chemical and from which the decoction vapour or gas obtained may be discharged simply and easily, without exposing the operator's hands to any danger of being scalded in either case.

On the accompanying drawing the invention is represented in four embodiments shown by way of example, viz.

Fig. 1 is a side elevation and partly a longitudinal section of an electrically heated kettle, Fig. 2 is a side elevation of a kettle equipped with a spirit-flame heater, Fig. 3 is a side elevation of a further embodiment of the invention in which a discharge pipe of such a kind is employed through which the liquid can be forced out from the vessel by means of an internal pressure exceeding the atmospheric, whilst Fig. 4 is the vertical section of a gas-developing vessel.

On Fig. 1 of the accompanying drawing, $a$ denotes a vessel containing a closed space, whilst $b$ denotes the removable lid part of this vessel, fixed on the vessel preferably by means of a bayonet-like closing device. Through the lid $b$ a screw-spindle $c$ projects into the interior of the vessel, the said screw-spindle being fitted outside with a turning knob $d$, and passing through the stuffing box $f$ so that the screw-spindle will be tight against leakage also during its rotation. It is on this screw-spindle that, in the inside of the vessel, the strainer box $g$ capable of being opened is mounted, the said strainer box being, however, unable to follow the rotation of the screw-spindle, but merely gliding up and down the spindle in case the latter is rotated. The rotation of the strainer box is prevented by the bar $h$ surrounding the screw-spindle in a fork-like manner, e. g., along the whole length of the latter, both branches of the said forked bar being encompassed as by a stop by the sheathing-like extension piece $i$ of the strainer box. Into the interior of the vessel there projects the electric heater $j$ fixed to the lid $b$. In addition hereto the safety valve $k$ is also mounted on the lid, whilst the discharge pipe $o$ of the vessel is closed by the ball-valve $m$.

When using the apparatus, liquid, e. g., water is poured into the vessel $a$, whilst the substance of which a decoction is to be made, e. g. tea leaves, ground coffee etc. is placed into the strainer box $g$. Following this, the liquid is made to boil by means of the electric heater $j$ and the strainer box $g$ is immersed into the liquid at the proper moment, by turning the turning knob $d$, thereby causing the substance contained in the said strainer box to be parboiled.

After parboiling during a sufficient length of time, the strainer box $g$ is, by rotating the spindle $c$ in the opposite direction, again raised above the liquid space. This process may be repeated as many times as desired. After opening the ball-valve $m$, the decoction obtained can be poured out easily from the vessel through the discharge pipe $o$. The vapour developed during the boiling of the water escapes with a whistling sound through the valve $k$.

The embodiment according to Fig. 2 differs from the one according to Fig. 1 only in that a spirit-flame heater $n$ is employed instead of the electric heater $j$, and further in that, for the purpose of preventing the rotation of the strainer box $g$, a bar $p$ is provided in the interior of the vessel, whilst the strainer box is fitted with a stop $r$ which in case of rotation makes impact against the said bar.

In the case of the embodiment according to Fig. 3, it is the electric heater $j$ itself that prevents any rotation of the strainer box, the stop $r$ of the strainer box making impact against the heater $j$ in case of any rotation of the strainer box. In this embodiment an outlet pipe $s$ projecting, in the interior of the vessel, into the lower space of the latter is fixed on the lid. The outside open end of this pipe is closed by the valve $t$, which through the connecting bar $v$ is connected in a manner ensuring positive motion with the closing member $z$ of the safety valve $k$. Owing to the connection ensuring positive motion it is alternately either the outlet pipe $s$ or the safety valve $k$ that is open, and thus in the open position of the outlet pipe it is the pressure above atmospheric existing in the vessel itself that drives out the liquid from the vessel.

In the embodiment according to Fig. 4, no heater or heating device is employed at all and the external upper end of the outlet pipe $s_1$ projecting into the interior of the vessel is widened so as to constitute an expansion vessel $w$. This embodiment of the apparatus is used for developing gases or vapours. One of the active substances participating in the development of the gas or vapour is placed into the box $g$, whilst the other active substance consists in the liquid filled into the vessel. If the box $g$ is immersed into the liquid, the development of gas or vapour will start, and it will then be possible to discharge the said gas or vapour through the valve $k_1$. The pressure above the atmospheric set up is balanced by the vessel $w$, by which the liquid forced out from the vessel $a$ through the pipe $s_1$ is collected and from which the liquid will upon the diminution of the pressure flow back into the vessel $a$.

In the embodiments shown, the screw-spindle $c$, together with the box $g$ mounted on it, as well as the electric heater $j$, the outlet pipe $s$ and the valve $k$ are mounted on the lid $d$, so that when lifting off the lid these members can be removed from the vessel jointly.

It is a very great advantage of all the embodiments enumerated, that, when immersing the box, the hot vapours or gases will not come into contact with the hand of the person handling the apparatus and it will accordingly be possible to effect such immersion conveniently.

What I claim is:

1. Apparatus intended for use in households, for the production of decoctions in a closed space, particularly a tea or coffee boiler, consisting of a closed vessel fitted with a safety valve, and, further, of a filtering box capable of being opened for accommodating the material from which an extract is to be made, the said box being arranged in the interior of the said vessel, of a screw spindle, not displaceable in the vertical direction and journalled in a manner rendered tight against leakage on the lid of the vessel, which spindle enables the filtering box to be raised or lowered in the interior of the vessel and projects into the open beyond the lid of the vessel and ends in a turning headpiece and, further, of a heater fixed to the lid of the vessel and projecting into the lower part of vessel and, finally, of a closeable discharge tube, projecting into the closed vessel, through which tube the liquid can be forced out from the vessel by vapor or gas pressure, in which apparatus the strainer box, the raising spindle of the latter, the electric heater, the safety valve and the outlet pipe are fixed to the lid of the vessel so that when lifting off the lid it should be possible to remove them from the vessel jointly.

2. Apparatus intended for use in households, for the production of decoctions in a closed space, particularly a tea or coffee boiler, consisting of a closed vessel fitted with a safety valve, and, further, of a filtering box capable of being opened for accommodating the material from which an extract is to be made, the said box being arranged in the interior of the said vessel, of a screw spindle, not displaceable in the vertical direction and journalled in a manner rendered tight against leakage on the lid of the vessel, which spindle enables the filtering box to be raised or lowered in the interior of the vessel and projects into the open beyond the lid of the vessel and ends in a turning headpiece, and, further, of a heater fixed to the lid of the vessel and projecting into the lower part of vessel and, finally, of a closeable discharge tube, projecting into the closed vessel, through which tube the liquid can be forced out from the vessel by vapor or gas pressure, in which apparatus means are provided by which the closing of the safety valve is connected in a manner ensuring positive motion with the closing device of the outlet pipe.

SUSANNAH BERGER, née KERESZTES.